US008966048B2

(12) United States Patent  (10) Patent No.: US 8,966,048 B2
Maity  (45) Date of Patent: Feb. 24, 2015

(54) PROVIDING A COMMON MANAGEMENT CONSOLE FOR MANAGING THE OPERATION OF A SERVER COMPUTER

(71) Applicant: American Megatrends, Inc., Norcross, GA (US)

(72) Inventor: Sanjoy Maity, Snellville, GA (US)

(73) Assignee: American Megatrends, Inc., Norcross, GA (US)

( * ) Notice: Subject to any disclaimer, the term of this patent is extended or adjusted under 35 U.S.C. 154(b) by 3 days.

(21) Appl. No.: 13/936,820

(22) Filed: Jul. 8, 2013

(65) Prior Publication Data

US 2013/0297766 A1  Nov. 7, 2013

Related U.S. Application Data

(63) Continuation of application No. 11/473,669, filed on Jun. 23, 2006, now Pat. No. 8,484,325.

(51) Int. Cl.
*H04L 29/08* (2006.01)
*H04L 12/26* (2006.01)

(52) U.S. Cl.
CPC .............. *H04L 67/16* (2013.01); *H04L 43/50* (2013.01)
USPC ............ 709/223; 709/219; 709/224; 709/225

(58) Field of Classification Search
CPC .................................. H04L 63/00; H04L 9/00
USPC .................................. 709/219, 221, 223, 224
See application file for complete search history.

(56) References Cited

U.S. PATENT DOCUMENTS

| 6,170,021 | B1 | 1/2001 | Graf |
| 6,546,419 | B1 | 4/2003 | Humpleman et al. |
| 7,543,277 | B1 * | 6/2009 | Righi et al. .................. 717/125 |
| 2001/0047406 | A1 | 11/2001 | Araujo et al. |
| 2002/0077095 | A1 | 6/2002 | Fu et al. |
| 2003/0065864 | A1 * | 4/2003 | Hollinger .................... 710/305 |
| 2003/0084133 | A1 * | 5/2003 | Chan et al. .................. 709/222 |

(Continued)

OTHER PUBLICATIONS

"IBM eServer xSeries and Blade Center Server Management"—IBM, May 2005 http://www.redbooks.ibm.com/redbooks/pdfs/sg246495.pdf.*

(Continued)

*Primary Examiner* — Randy Scott
(74) *Attorney, Agent, or Firm* — Morris, Manning & Martin, LLP; Tim Tingkang Xia, Esq.

(57) ABSTRACT

A method, system, apparatus, and computer-readable medium for providing a common management console for managing the pre- and post-operating system operation of a computer system are provided. The method includes: receiving, at a management appliance, first and second requests from one or more remote management consoles to manage first and second server computers, respectively; receiving first and second remote console data formatted according to first and second remote console protocols from the first and second server computers, respectively; converting, at the management appliance, the received first and second remote console data to first and second converted remote console data, respectively, in a common format in accordance with a common protocol capable of expressing the first and second remote console protocols; and transmitting the first and second converted remote console data in the common format to the remote management console for display.

10 Claims, 6 Drawing Sheets

(56) References Cited

U.S. PATENT DOCUMENTS

| | | |
|---|---|---|
| 2003/0088655 A1 | 5/2003 | Leigh et al. |
| 2004/0103220 A1 | 5/2004 | Bostick et al. |
| 2004/0267764 A1 | 12/2004 | Rothman et al. |
| 2005/0055486 A1 | 3/2005 | Natu et al. |
| 2006/0010199 A1 | 1/2006 | Brailean et al. |
| 2006/0168099 A1 | 7/2006 | Diamant |
| 2006/0218255 A1* | 9/2006 | Chan et al. .................... 709/220 |
| 2006/0218285 A1 | 9/2006 | Talwar et al. |
| 2007/0208891 A1 | 9/2007 | Liu |

OTHER PUBLICATIONS

"HP Business Desktop BIOS"—May 2004 HP http://bizsupport2.austin.hp.com/bc/docs/support/SupportManual/c00166277/c00166277.pdf.

"Upgrading BIOS Versions Remotely"—IBM, Oct. 2005 http://www.cisco.com/en/US/docs/app_ntwk_services/waas/acns/maintenance/v5x/upgrade/guide/6695bios.pdf.

* cited by examiner

PROVIDING A COMMON MANAGEMENT CONSOLE FOR MANAGING THE OPERATION OF A SERVER COMPUTER

CROSS-REFERENCE TO RELATED APPLICATIONS

This application is a continuation of U.S. patent application Ser. No. 11/473,669 filed on Jun. 23, 2006. The disclosure of the above application is incorporated herein by reference in its entirety.

BACKGROUND

A keyboard, video, mouse ("KVM") switch is a hardware device that allows a single keyboard, video monitor, and mouse input device to control more than one computer. KVM switches are typically connected to each of the computers to be controlled using a keyboard cable, a video cable, and a mouse cable. In traditional installations, a local computer is also connected to the KVM switch with a keyboard cable, a video cable, and a mouse cable. Through the local computer, a user can control any of the other computers connected to the KVM switch. The KVM switch provides functionality for specifying which of the connected computers are controlled by the local computer. KVM switches are commonplace in server installations where it is only necessary to periodically access each separate server computer at a time. In this manner, none of the server computers are required to have their own dedicated keyboard, video monitor, or mouse.

More advanced KVM switches connect to a local or wide area network ("WAN") rather than to a local computer. Through the network connection, the user of a remote computer can connect to the KVM switch and control any of the connected computers. These types of KVM switches are referred to as KVM over internet protocol ("KVMoIP") switches. KVMoIP switches generally include a dedicated microcontroller and video capture hardware to capture the video signals generated by the controlled computer, to compress and packetize the video signals, and to send the compressed data over the network to the remote computer. The video data is then decompressed and displayed at the remote computer. Keyboard and mouse signals are transferred to the KVMoIP switch from the remote computer in a similar manner.

The main benefit of KVMoIP switches is that they allow access to the computers connected to the KVMoIP switch even before the computers have booted an operating system. For instance, through a KVMoIP switch, the power-on self test ("POST") and basic input/output system ("BIOS") of a connected computer may be viewed, accessed, and controlled. Because KVMoIP switches do not require any software or special hardware on the connected computers, they are referred to as "out-of-band" solutions.

Although KVMoIP switches do provide several benefits over traditional KVM switches, these switches are not without their drawbacks. The first drawback stems from the fact that it is necessary for a separate keyboard cable, video cable, and mouse cable to be utilized between the KVMoIP switch and every connected computer. These cables are expensive and, in large server installations, add to already complex wiring. The second problem with KVMoIP switches stems from the fact that these devices must capture, compress, and transmit the video output of the connected computers. In many cases, the computers are connected to the KVMoIP switch through an analog video signal. In this configuration, it is especially difficult to meaningfully compress an analog video signal that typically contains noise and other artifacts. Even where the video signal is digital, the compression process still requires considerable processing capacity within the KVMoIP switch, which can be expensive and also generates undesirable heat.

One alternative to KVMoIP switches for remotely controlling the operation of computer systems are remote graphical console software packages. These solutions utilize server software executing on the controlled computer to capture video screen application programming interface ("API") calls and to transmit them to a client application executing on the remote computer. The client application then replays the API calls so that the display is shown at the remote computer. Remote graphical console software packages also transmit keyboard and mouse data between the controlled computer and the remote computer so that a user can interact with the controlled computer as if she was located proximately to the controlled computer. Because remote graphical console software packages do require the installation and execution of software on the controlled computer, these solutions are referred to as "in-band" solutions.

While "in-band" solutions do not require the costly cables or hardware of "out-of-band" solutions, these solutions are also not without their drawbacks. In particular, the main problem with "in-band" solutions is that they do not allow access to or control of the connected computers prior to the loading of the operating system and the remote graphical console server software. This is because software based remote graphical console applications require the operating system to boot and to load a driver before video can be redirected. This means that access to POST and BIOS screens of the connected computers is not possible using "out-of-band" solutions. This is a significant limitation for system administrators responsible for managing installations of server computers.

It is with respect to these considerations and others that the various embodiments described below have been made.

SUMMARY

Certain aspects of the present disclosure are directed to a method for providing a common management console for managing the pre- and post-operating system operation of server computers. The method includes: receiving, at a management appliance, first and second requests from one or more remote management consoles to manage first and second server computers, respectively; establishing a network connection between the management appliance and the first and second server computers, respectively; receiving first and second remote console data from the first and second server computers via the network connections, respectively, wherein the first and second remote console data are formatted according to first and second remote console protocols, respectively, wherein the first and second remote console protocols are different from each other; converting, at the management appliance, the received first and second remote console data to first and second converted remote console data, respectively, in a common format in accordance with a common protocol capable of expressing the first and second remote console protocols; and transmitting the first and second converted remote console data in the common format to the remote management console for display.

In certain embodiments, the first remote console protocol is the remote desktop protocol (RDP). In certain embodiments, the second remote console protocol is the virtual network computing protocol (VNC). In certain embodiments, the method further includes receiving, at the management appliance, third remote console data in accordance with the serial over local area network text protocol from a third server computer; and converting the third remote console data to third converted remote console data in the common format.

Certain aspects of the present disclosure are directed to a computer-readable medium having computer-executable instructions stored thereon which, when executed by a computer, cause the computer to perform the above methods.

Certain aspects of the present disclosure are directed to a computer-controlled apparatus capable of performing the above methods.

Certain aspects of present disclosure are directed to an apparatus for providing a common management console for managing the pre- and post-operating system operation of server computers. The apparatus includes: a processor; a network port; and a non-volatile memory storing program code, when executed by the processor, causing the apparatus to establish network connections to first and second server computers via the network port, receive first and second remote console data from the first and second server computers via the network connections, respectively. The first and second remote console data are formatted according to first and second remote console protocols, respectively. The first and second remote console protocols are different from each other. The program code further causes the apparatus to convert the received first and second remote console data to first and second converted remote console data, respectively, in a common format in accordance with a common protocol capable of expressing the first and second remote console protocols, and transmit the first and second converted remote console data in the common format to a remote management console for display.

In certain embodiments, the first remote console protocol is the remote desktop protocol (RDP). In certain embodiments, the second remote console protocol is the virtual network computing protocol (VNC). In certain embodiments, the program code, when executed by the processor, further causes the apparatus to receive, at the management appliance, third remote console data in accordance with the serial over local area network text protocol from a third server computer, and convert the third remote console data to third converted remote console data in the common format.

In certain embodiments, the remote management console comprises a computer system operative to execute a remote management software application. The remote management software application is operative to receive the converted remote console data formatted according to the common protocol, to decode the converted remote console data, and to display the remote console data in a single graphical user interface window.

In certain embodiments, the program code, when executed by the processor, further causes the apparatus to discover server computers including the first, second, and third server computers and capable of being managed through the apparatus, and to provide information identifying the discovered server computers to the remote management console.

In certain embodiments, the third server computer comprises a baseboard management controller operative to format the third remote console data using the serial over local area network text protocol and to transmit the third remote console data to the apparatus.

Certain aspects of the present disclosure are directed to a system for providing a common management console for managing the pre- and post-operating system operation of server computers. The system includes a management appliance comprising a processor, a network port, and a non-volatile memory storing program code, when executed by the processor, causing the appliance to establish network connections to first and second server computers via the network port, receive first and second remote console data from the first and second server computers via the network connections, respectively. The first and second remote console data are formatted according to first and second remote console protocols, respectively. The first and second remote console protocols are different from each other. The program code further causes the appliance to convert the received first and second remote console data to first and second converted remote console data, respectively, in a common format in accordance with a common protocol capable of expressing the first and second remote console protocols, and transmit the first and second converted remote console data in the common format to one or more remote management consoles for display; and a remote console application configured to receive the first and second converted remote console data from the management appliance, decode the first and second converted remote console data, and display the decoded remote console data in a single graphical user interface window.

In certain embodiments, the program code, when executed by the processor, further causes the apparatus to receive, at the management appliance, third remote console data in accordance with the serial over local area network text protocol from a third server computer, and convert the third remote console data to third converted remote console data in the common format.

The subject matter described herein may also be implemented as an apparatus, a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages will be apparent from a reading of the following detailed description and a review of the associated drawings.

DETAILED DESCRIPTION

Figure 1:
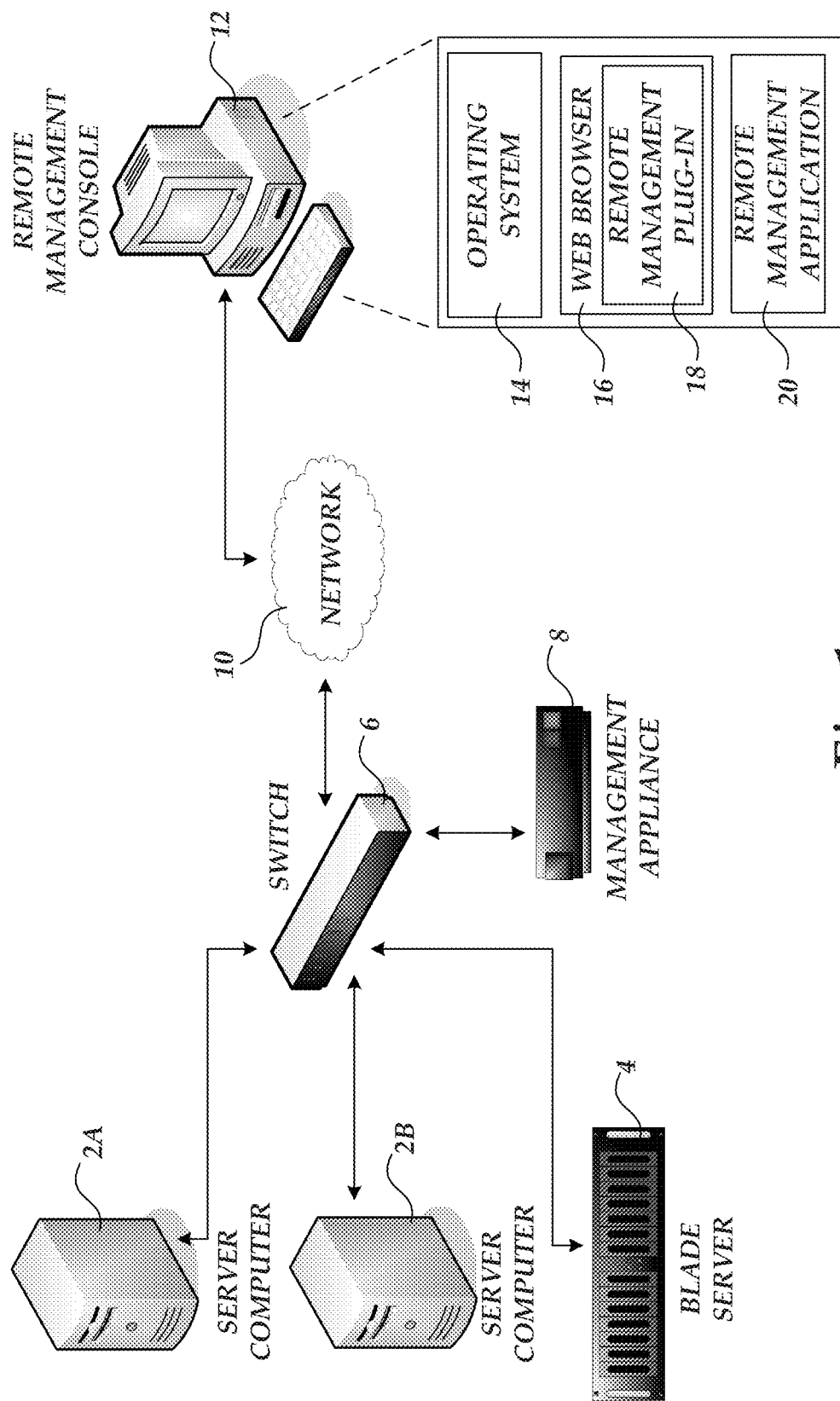
FIG. 1 is a computer system architecture diagram showing an illustrative operating environment for the disclosure provided herein.

Methods, systems, apparatuses, and computer-readable media are provided herein for managing both the pre- and post-operating system operation of a computer through a common management console. In the following detailed description, references are made to the accompanying drawings that form a part hereof, and in which are shown by way of illustration specific embodiments or examples. Referring now to the drawings, in which like numerals represent like elements throughout the several figures, aspects of the various implementations provided herein and an exemplary operating environment will be described.

FIG. 1 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

Referring now to FIG. 1, an illustrative operating environment for the embodiments presented herein will be described. As shown in FIG. 1, a management appliance 8 is provided herein that is operative to connect to one or more server computers 2A-2B through a network switch 6. The management appliance 8 may also connect to a blade server 4 that includes a multitude of individual server blades within a single housing. It should be appreciated that the management appliance 8 is described herein as being utilized in conjunction with server computers, but may also be utilized with virtually any type of computer system. It should be appreciated that the management appliance 8 also includes capabilities for discovering and identifying the server computers connected to the switch 6. Additional details regarding the configuration and operation of the server computers 2A-2B will be provided in greater detail below.

As also shown in FIG. 1, a remote management console computer 12 is operative to connect to the management appliance 8 through the network 10. The network 10 may comprise a local or wide area network, including the internet. As will be described in greater detail below, the remote management console 12 comprises a standard laptop or desktop computer operative to execute an operating system and a remote management application program 20. The remote management application program 20 may take the form of a stand-alone application. Alternatively, the functionality of the remote management application program 20 may be incorporated into a remote management browser plug-in 18 that can be executed in a standard web browser program 16, like INTERNET EXPLORER from MICROSOFT CORPORATION of Redmond, Wash.

According to aspects of the embodiments presented herein, the remote management application 20 is utilized to establish a network connection between the remote management console 12 and the management appliance 8. Through the network connection, the management appliance 8 can provide to the remote management console 12 a list of the servers 2A-2B and 4 that are manageable from the remote management console 12. In response to receiving a selection of one of the listed servers, the management appliance 8 is operable to establish a network connection to the selected server. For instance, the management appliance 8 may connect to the server 2A.

Through the network connection, the management appliance 8 receives remote console data from the connected server 2A. The remote console data may be formatted according to any one of a multitude of protocols for transmitting remote console data. For instance, according to one embodiment, the server 2A may be equipped with a baseboard management controller ("BMC") operative to transmit remote console data formatted using a text protocol, such as the serial over LAN protocol. Such a protocol is utilized to transmit pre-operating system text remote console data, such as POST and BIOS display screens. Such text remote console data may be transmitted prior to the loading of an operating system on the server computer 2A. Additionally, such serial text output may be transmitted even after an operating system has been loaded, such as when a UNIX-based operating system is utilized at the server 2A.

According to other aspects, the server 2A may also be equipped with an in-band remote graphical console server application that generates remote console data once an operating system has been loaded on the server computer 2A. For instance, servers executing the LINUX operating system may utilize the virtual network computing ("VNC") graphical remote console protocol. Servers executing the MICROSOFT WINDOWS operating system may utilize the remote desktop protocol ("RDP"). Other graphical remote console protocols may also be utilized.

As will be described in greater detail below, the management appliance 8 is further operative to detect the remote console protocol being utilized by the server 2A to format the remote console data. Once the protocol has been detected, the management appliance 8 converts the received remote console data, regardless of protocol, into a common format capable of encapsulating each of the possible protocols. The converted console data in the common format is then transmitted to the remote management application 20.

The remote console application 20 receives the converted data in the common format from the management appliance 8. The remote console application 20 then decodes the remote console data from the common format and utilizes the decoded data to display the remote console data on a display screen of the remote management console 12.

In one embodiment, a single graphical user interface window, called a common management console, is displayed by the remote console application 20 to display both text and graphical remote console data. In this manner, a common window is provided for viewing and interacting with the text remote console data provided by the server computer 2A prior to booting an operating system and the graphical remote console data provided by the server computer 2A after the operating system has been loaded. Moreover, the common window may be displayed regardless of the console server application or graphical remote console protocol that is utilized by the server computer 2A.

Mouse and keyboard input provided at the remote management console 12 is also transmitted to the management appliance 8 via the remote management application 20. The input is provided to the server computer 2A by the management appliance 8. In this manner, the remote management application 20 can be utilized to view text and graphical remote console data from the server 2A and to control the operation of the server 2A. Additional details regarding the server computer 2A, the management appliance 8, and the remote management console 12 and remote management application 20 will be provided below with respect to FIGS. 2-5B.

Figure 2:
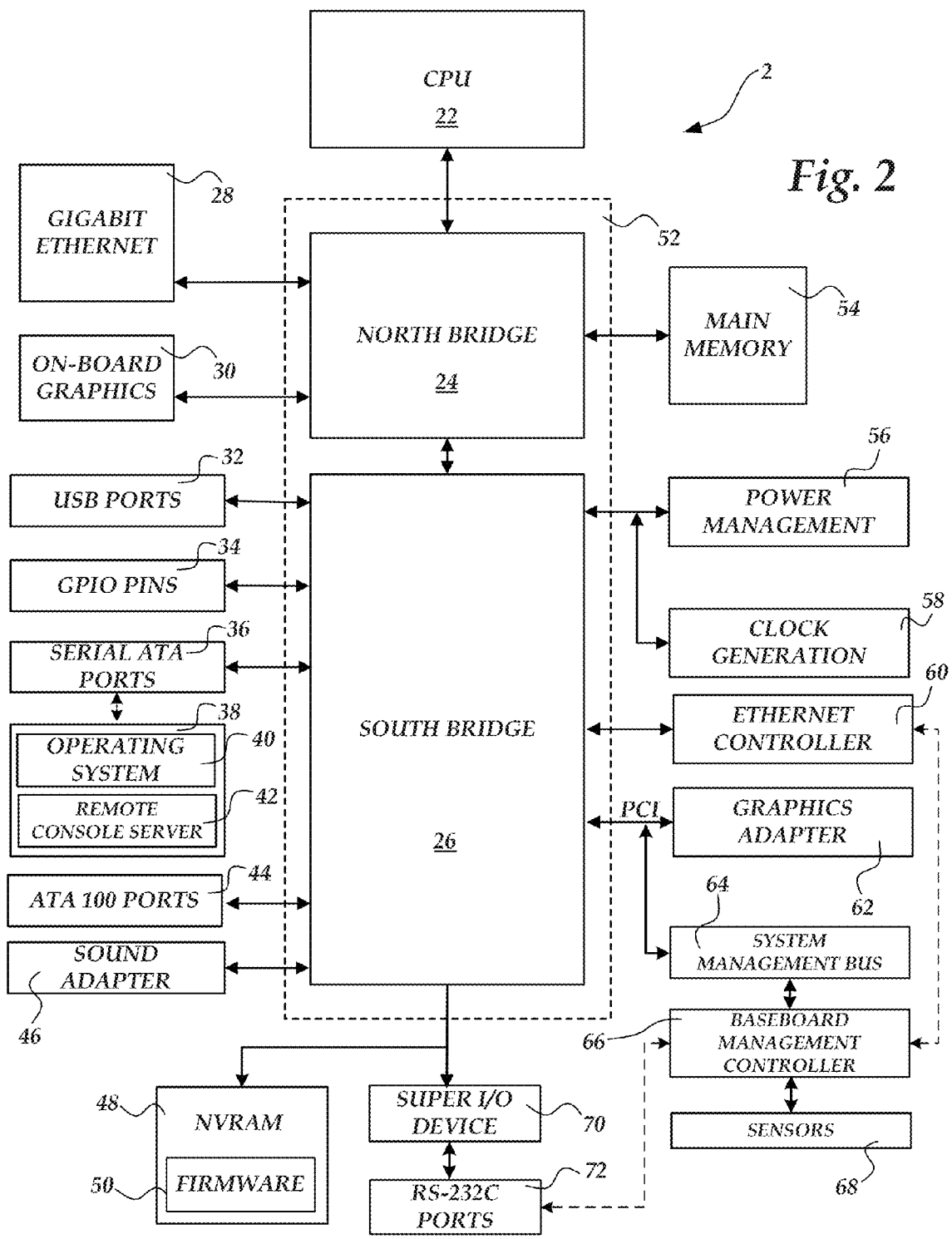
FIG. 2 is a computer architecture diagram that illustrates various components of a server computer utilized in the embodiments described herein.

Turning now to FIG. 2, an illustrative computer architecture for a server computer 2 utilized in the embodiments described herein will be provided. It should be appreciated that although the embodiments described herein are discussed in the context of managing a conventional server computer, virtually any type of computing device may be utilized. FIG. 2 shows an illustrative computer architecture for a server computer 2 that may be remotely managed utilizing the implementations described herein. It should be appreciated that the architecture shown in FIG. 2 is applicable to the server computers 2A-2B and the blade server 4. The remote management console 12 may also utilize some or all of the conventional computing components illustrated in and described with reference to FIG. 2.

The server computer 2 includes a baseboard, or "motherboard", which is a printed circuit board to which a multitude of components or devices may be connected by way of a system bus or other electrical communication path. In one illustrative embodiment, a CPU 22 operates in conjunction with a chipset 52. The CPU 22 is a standard central processor that performs arithmetic and logical operations necessary for the operation of the computer. The server computer 2 may include a multitude of CPUs 22.

The chipset 52 includes a north bridge 24 and a south bridge 26. The north bridge 24 provides an interface between the CPU 22 and the remainder of the computer 2. The north bridge 2 also provides an interface to a random access memory ("RAM") used as the main memory 54 in the computer 2 and, possibly, to an on-board graphics adapter 30. The north bridge 24 may also include functionality for providing networking functionality through a gigabit Ethernet adapter 28. The gigabit Ethernet adapter 28 is capable of connecting the computer 2 to another computer via a network. Connections which may be made by the network adapter 28 may include LAN or WAN connections. LAN and WAN networking environments are commonplace in offices, enterprise-wide computer networks, intranets, and the internet. The north bridge 24 is connected to the south bridge 26.

The south bridge 26 is responsible for controlling many of the input/output functions of the computer 2. In particular, the south bridge 26 may provide one or more universal serial bus ("USB") ports 32, a sound adapter 46, an Ethernet controller 60, and one or more general purpose input/output ("GPIO") pins 34. The south bridge 26 may also provide a bus for interfacing peripheral card devices such as a graphics adapter 62. In one embodiment, the bus comprises a peripheral component interconnect ("PCI") bus. The south bridge 26 may also provide a system management bus 64 for use in managing the various components of the computer 2. Additional details regarding the operation of the system management bus 64 and its connected components are provided below.

The south bridge 26 is also operative to provide one or more interfaces for connecting mass storage devices to the computer 2. For instance, according to an embodiment, the south bridge 26 includes a serial advanced technology attachment ("SATA") adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs, such as the SATA disk drive 38. As known to those skilled in the art, an operating system 40 comprises a set of programs that control operations of a computer and allocation of resources. An application program is software that runs on top of the operating system software, or other runtime environment, and uses computer resources to perform application specific tasks desired by the user. As will be described in greater detail below, a remote console server application 42 is stored on the drive 38 and executed by the computer 2 to redirect the text or graphical display of the computer 2 once the operating system and remote console server application 42 have been loaded.

According to one embodiment of the invention, the operating system 40 comprises the LINUX operating system and the remote console server application 42 comprises remote server application compatible with the VNC protocol. According to another embodiment of the invention the operating system 40 comprises the WINDOWS SERVER operating system from MICROSOFT CORPORATION and the remote console server application 42 comprises a remote desktop application compatible with the RDP protocol. According to another embodiment, the operating system 40 comprises the UNIX or SOLARIS operating system. In this embodiment, the remote console server 42 comprises a server compatible with the serial desktop protocol for provided a redirect text display. It should be appreciated that other types of remote desktop servers compatible with other types of remote desktop protocols may also be utilized.

The mass storage devices connected to the south bridge 26, and their associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 6 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 2 and to transfer information between elements within the computer 2. It should be appreciated that during the execution of the BIOS and POST portions for the firmware 50, the text screen displays of the computer 2 may be provided via the serial ports 72 or via the Ethernet controller using the serial over LAN protocol.

As described briefly above, the south bridge 26 may include a system management bus 64. The system management bus 64 may include a BMC 66. In general, the BMC 66 is a microcontroller that monitors operation of the computer system 2. In a more specific embodiment, the BMC 66 monitors health-related aspects associated with the computer system 2, such as, but not limited to, the temperature of one or more components of the computer system 2, speed of rotational components (e.g., spindle motor, CPU Fan, etc.) within the system, the voltage across or applied to one or more components within the system 2, and the available or used capacity of memory devices within the system 2. To accomplish these monitoring functions, the BMC 66 is communicatively connected to one or more components by way of the management bus 64. In an embodiment, these components include sensor devices for measuring various operating and performance-related parameters within the computer system 2. The sensor devices may be either hardware or software based components configured or programmed to measure or detect one or more of the various operating and performance-related parameters. The BMC 66 functions as the master on the management bus 64 in most circumstances, but may also function as either a master or a slave in other circumstances. Each of the various components communicatively connected to the BMC 66 by way of the management bus 64 is addressed using a slave address.

The management bus 64 is used by the BMC 66 to request and/or receive various operating and performance-related parameters from one or more components, which are also communicatively connected to the management bus 64. For instance, in one embodiment, the management bus 64 may communicatively connects the BMC 66 to a CPU temperature sensor and a CPU fan (not shown in FIG. 2), thereby providing a means for the BMC 66 to monitor and/or control operation of these components. The BMC 66 may also include sensors 68 connected directly thereto. For instance, the sensors 68 may include, without limitation, tachometers, heat sensors, voltage meters, amp meters, and digital and analog sensors. It should be appreciated that the management bus 64 may include components other than those explicitly shown in FIG. 2. In an embodiment, the management bus 130 is an I²C® bus, which is manufactured BY PHILLIPS SEMICONDUCTORS® and described in detail in the I²C® bus Specification, version 2.1 (January 2000).

It should be appreciated that several physical interfaces exist for communicating with the BMC 66 in additional to the management bus 64. In particular, the serial ports 72 and the Ethernet controller 60 may be utilized to establish a connection with the BMC 66. Through these interfaces, a connection can be established with the BMC for obtaining health and management data regarding the operation of the computer 2.

According to one embodiment, the firmware of the BMC 66 adheres to the Intelligent Platform Management Interface ("IPMI") industry standard for system monitoring and event recovery. The IPMI specification provides a common message-based interface for accessing all of the manageable features in the computer 2. IPMI includes a rich set of predefined commands for reading temperature, voltage, fan speed, chassis intrusion and other parameters. System event logs, hardware watchdogs, and power control can also be accessed through IPMI. In this manner, IPMI defines protocols for accessing the various parameters collected by the BMC 66 through the operating system 40 or through an external connection, such as through a network or serial connection. Additional details regarding the operation of the computer 2 in conjunction with the management appliance 8 and the remote management console 12 will be provided below with respect to FIGS. 3-5B.

It should be appreciated that the computer 2 may comprise other types of computing devices, including hand-held computers, embedded computer systems, personal digital assistants, and other types of computing devices known to those skilled in the art. It is also contemplated that the computer 2 may not include all of the components shown in FIG. 2, may include other components that are not explicitly shown in FIG. 2, or may utilize an architecture completely different than that shown in FIG. 2.

Figure 3:
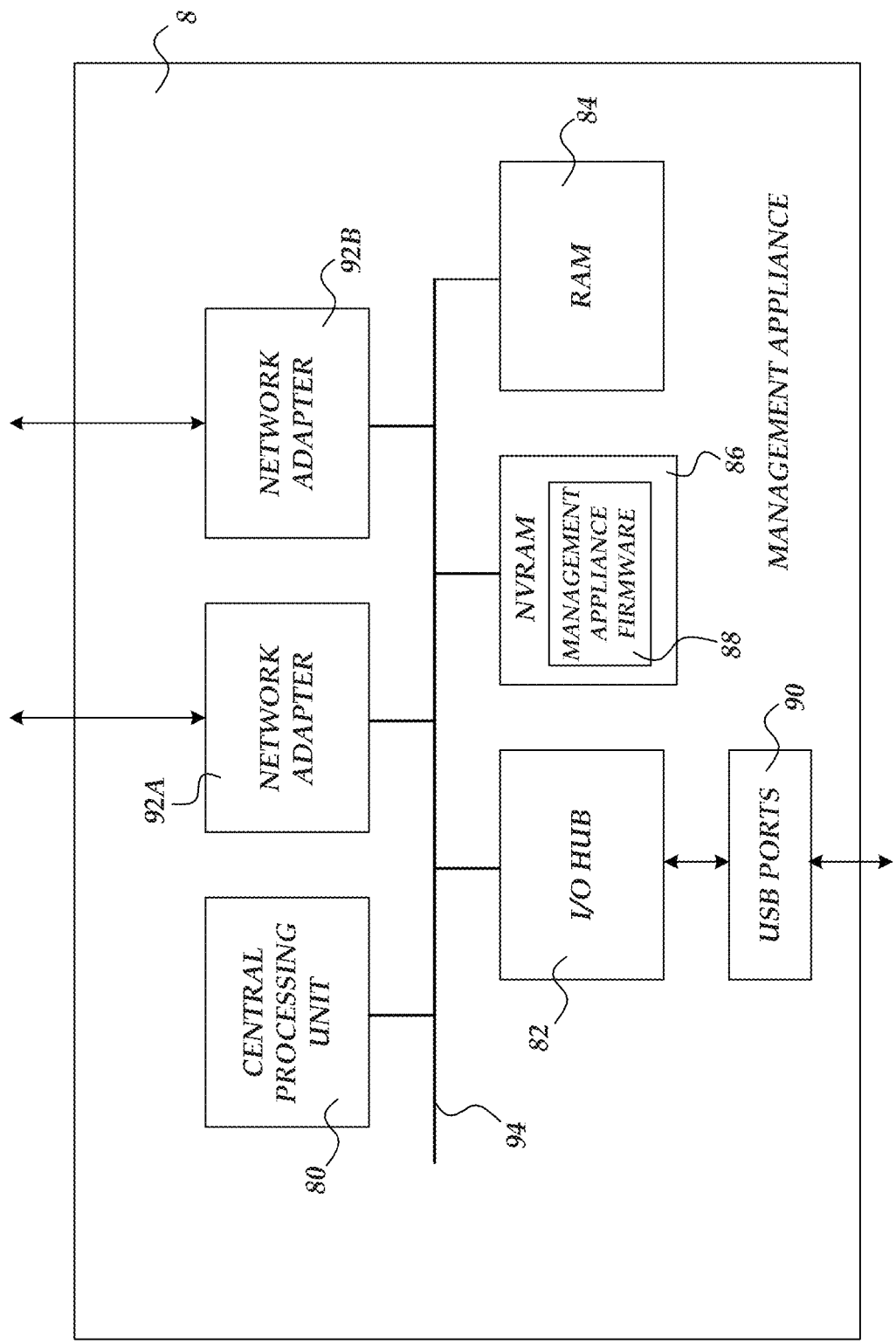
FIG. 3 is a computer architecture diagram that illustrates aspects of a computer architecture for a management appliance described herein.

Referring now to FIG. 3, details regarding an illustrative hardware architecture for implementing the management appliance 8 will be described. As shown in FIG. 3, the management appliance 8 includes a CPU 80, a RAM 84, and a NVRAM 86. The NVRAM 86 stores a firmware 88 for controlling the operation of the management appliance 8. Additional details regarding the operation of the firmware 88 will be provided below with respect to FIGS. 4A-4B.

As also shown in FIG. 3, the management appliance 8 includes network adaptors 92A-92B. The network adaptors 92A-92B are utilized to enable network connections to the remote management console 12 and the server computers 2A-2B and 4. According to one embodiment, the management device 8 may also include an input/output ("I/O") hub 82 for providing various I/O ports. For instance, in one embodiment, one or more USB ports 90 may be provided by the management appliance 8. Other types of I/O ports may also be provided in a similar manner. As shown in FIG. 3, the management appliance 8 also includes a bus 94 for interconnecting the various hardware components described herein. Additional details regarding the operation of the management appliance 8 will be provided below with respect to FIGS. 4A-4B.

Figure 4A:
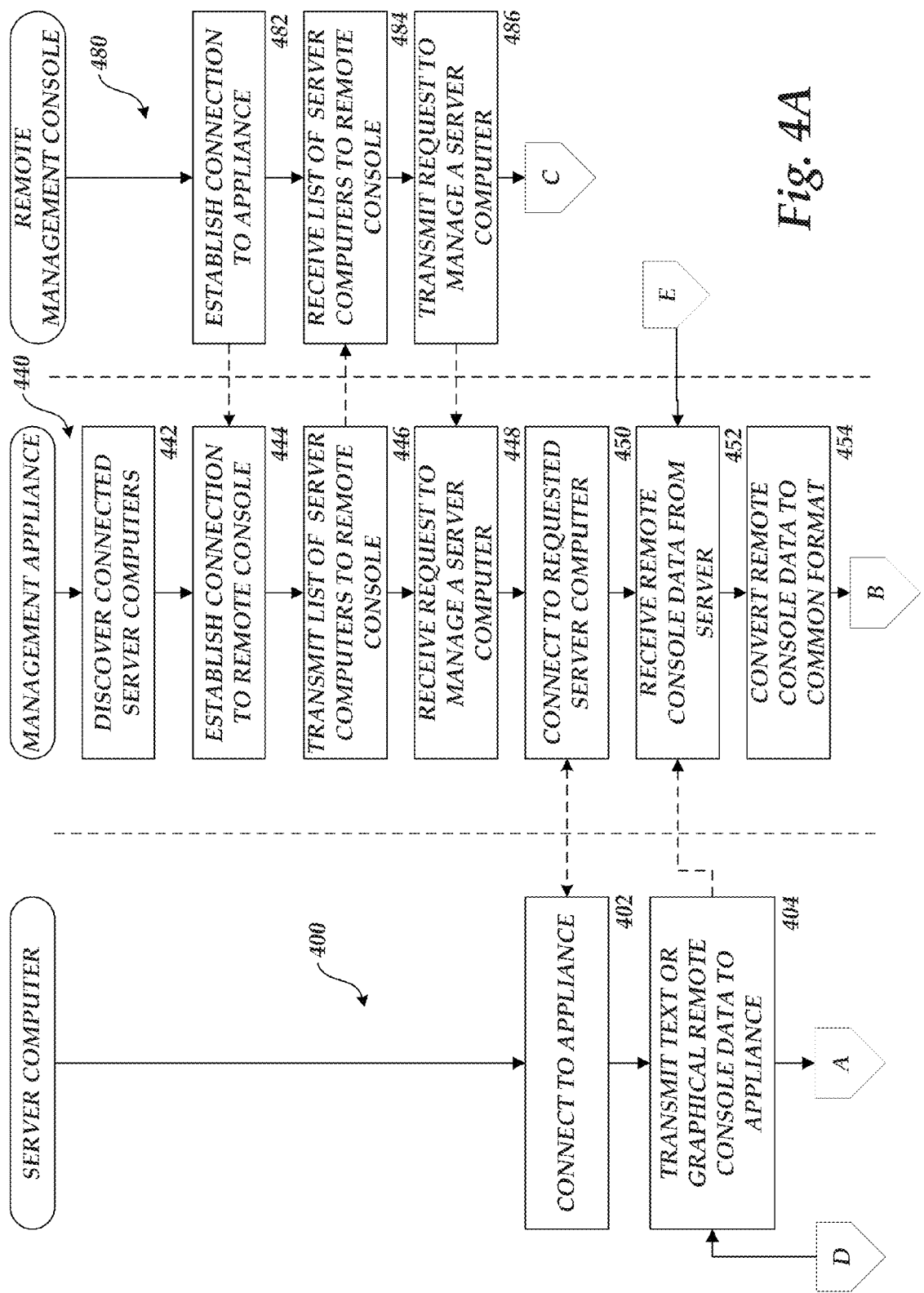
FIGS. 4A-4B are flow diagrams illustrating the operation of a server computer, management appliance, and remote management console according to one embodiment described herein.
Figure 4B:
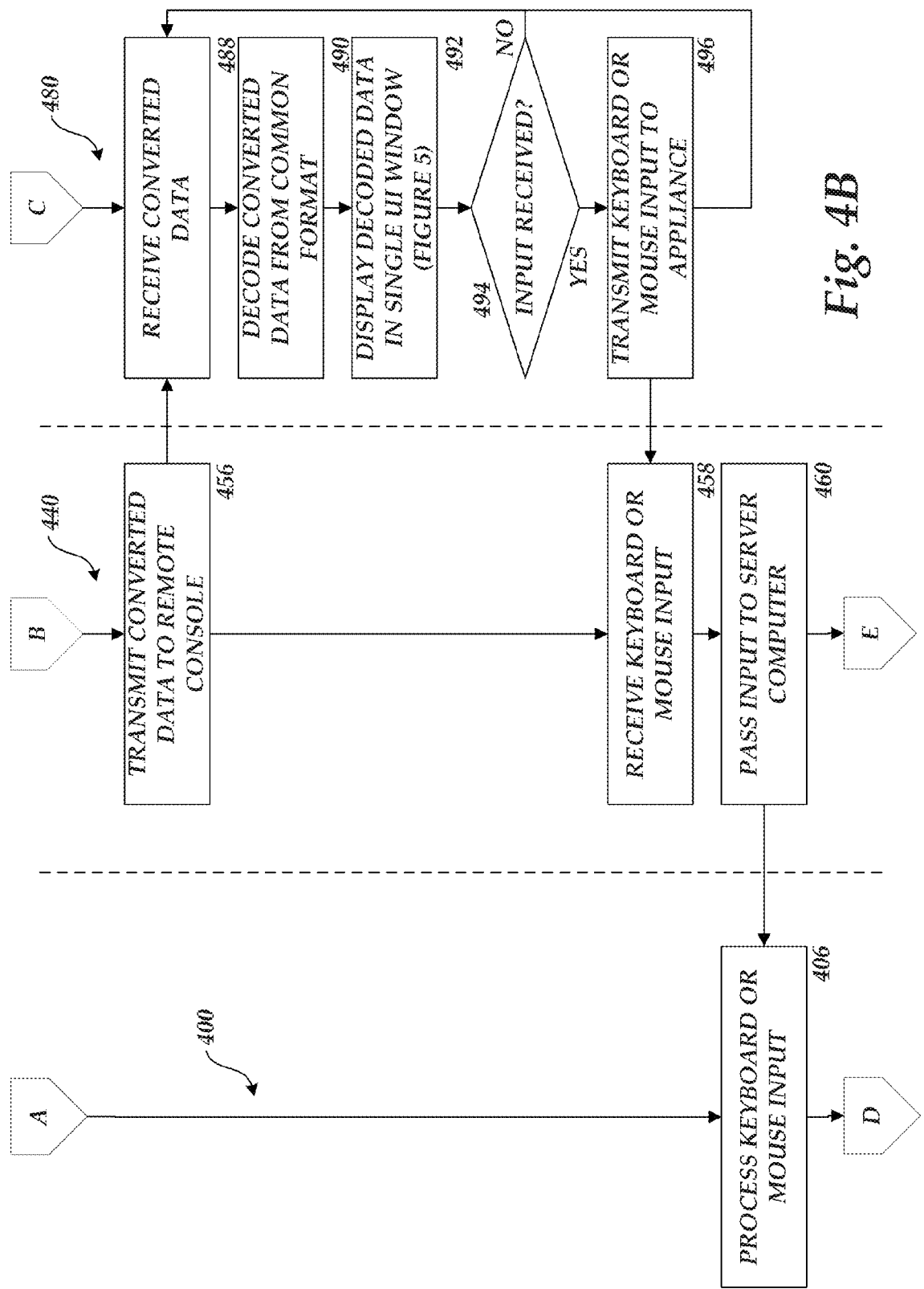

Referring now to FIGS. 4A-4B, several illustrative routines 400, 440, and 480 will be described in detail illustrating the operation of the server computer 2, the management appliance 8, and the remote management console 12, respectively. The logical operations of the various implementations presented herein are implemented (1) as a sequence of computer implemented acts or program modules running on a computing system and/or (2) as interconnected machine logic circuits or circuit modules within the computing system. The implementation is a matter of choice dependent on the performance requirements of the computing system on which the embodiments described herein are implemented. Accordingly, the logical operations making up the implementations described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 440 begins at operation 442, where the management appliance 8 discovers the connected server computers 2A-2B and 4. At operation 482, the remote management console 12 receives a request from a user to establish a connection to the management appliance 8. In response to such a request, a connection is established between the management appliance 8 and the remote management console 12 at operations 444 and 482. Once a connection has been established, the management appliance 8 provides a list of the available server computers to the remote management console 12 at operation 446 and 484. This list may be displayed to a user by the remote management application 20. In response thereto, a user may select one of the server computers to be managed. A request is then transmitted to the management appliance 8 to manage the selected server computer at operations 486 and 448.

In response to receiving a request to manage one of the server computers, the management appliance 8 connects to the requested server at operations 450 and 402. The management appliance 8 then receives from the server computer remote console data at operations 404 and 452. The remote console data may be formatted according to one of a multitude of protocols. As discussed above, the remote console data may be formatted using the VNC protocol, the RDP protocol, or the serial over LAN protocol.

At operation 454, the management appliance 8 detects the protocol utilized by the server to format the received remote console data. Once the protocol has been detected, the management appliance 8 converts the remote console data into a common format. The common format comprises a format capable of encapsulating each of the possible remote console protocols. In this manner, remote console data expressed in RDP, VNC, or serial over LAN can be recomposed into a common format for transmission to the remote management console 12.

At operation 456, the management appliance 8 transmits the converted data to the remote management application 20 executing on the remote management console 12. The remote management application 20 receives the converted data at operation 488. At operation 490, the remote management application 20 decodes the converted data and, at operation 492, the application 20 displays the decoded remote console data. In this manner, the console of the server 2 is redirect to and displayed at the remote management console 12.

Figure 5A:
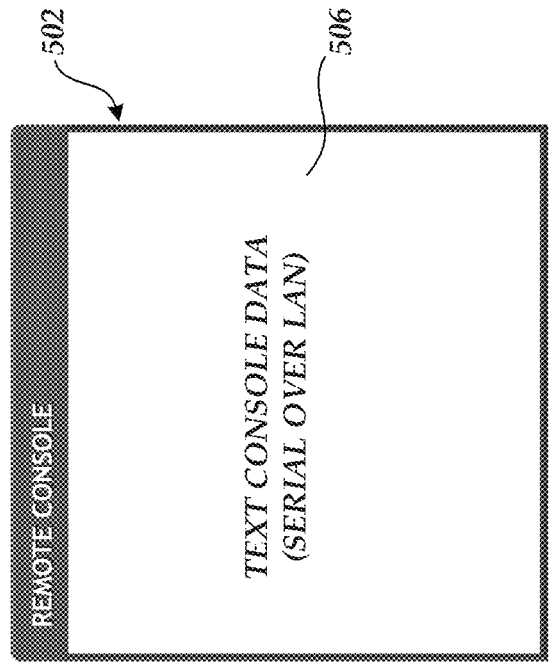
FIGS. 5A-5B are screen diagrams showing illustrate a single graphical user interface window output by a remote management console in one embodiment described herein.
Figure 5B:
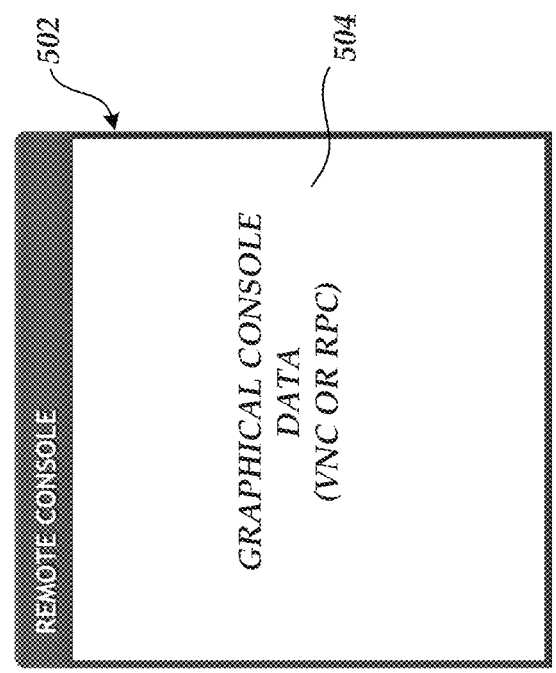

In one embodiment, the remote management console 12 is operative to display the remote console data in a single graphical user interface ("UI") window regardless of whether the remote console data is text, such as serial console data, or whether the remote console data is graphical console data. For instance, as shown in FIGS. 5A and 5B, a single window 502 may be displayed by the remote management application 20 to display both graphical console data 504 and text console data 506. In this manner, the text data provided by the server 2 before the operating system 40 has been loaded and the graphical console data provided by the remote console server 42 can be displayed and interacted with into a common management console UI window.

Referring again to FIGS. 4A-4B, a determination is made at the remote management application 20 as to whether input has been received that is directed to the remotely managed server. If not, the routine 480 returns back to operation 488, where additional converted remote console data is received from the management appliance 8 and displayed in the manner described above. If input is detected at operation 494, the routine 480 continues to operation 496 where the input is transmitted to the management appliance 8. At operation 458, the management appliance 8 receives the input and passes the input to the server computer at operation 460. At operation 406, the server 2A processes the input as if it were received locally. In this manner, a user of the remote management console 12 can control the operation of the server computer 2A.

From operation 406, the routine 400 branches back to operation 404, where remote console data is again transmitted to the management appliance 8. From operation 460, the routine 440 returns back to operation 452, where the management appliance 8 receives and converts the remote management data to a common format and transmits the converted data to the remote management console 12. From operation 496, the routine 480 returns back to operation 488, where additional converted remote console data is received from the management appliance 8 and displayed in the manner described above. It should be appreciated that these operations continue until such time as the operator of the remote management console 12 requests that console redirection be discontinued. At such time, the connection between the management appliance and the server 2A is stopped and the processing of remote console data is discontinued.

Based on the foregoing, it should be appreciated that embodiments described herein provide methods, systems, apparatuses, and computer-readable media for managing both the pre- and post-operating system operation of a computer through a common management console. Moreover, although the embodiments described herein have been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method for providing a common management console for managing the pre- and post-operating system operation of server computers, the method comprising:
   receiving, at a management appliance, first and second requests from one or more remote management consoles to manage first and second server computers, respectively;
   establishing a network connection between the management appliance and the first and second server computers, respectively;
   receiving first and second remote console data from the first and second server computers via the network connections, respectively, wherein the first and second remote console data are formatted according to first and second remote console protocols, respectively, wherein the first and second remote console protocols are different from each other;
   converting, at the management appliance, the received first and second remote console data to first and second converted remote console data, respectively, in a common format in accordance with a common protocol capable of expressing the first and second remote console protocols;
   transmitting the first and second converted remote console data in the common format to the remote management console for display;
   receiving, at the management appliance, third remote console data in accordance with the serial over local area network text protocol from a third server computer; and
   converting the third remote console data to third converted remote console data in the common format.

2. The method of claim 1, wherein the first remote console protocol is the remote desktop protocol (RDP).

3. The method of claim 2, wherein the second remote console protocol is the virtual network computing protocol (VNC).

4. An apparatus for providing a common management console for managing the pre- and post-operating system operation of server computers, the apparatus comprising:
   a processor;
   a network port; and
   a non-volatile memory storing program code, when executed by the processor, causing the apparatus to establish network connections to first and second server computers via the network port, receive first and second remote console data from the first and second server computers via the network connections, respectively, wherein the first and second remote console data are formatted according to first and second remote console protocols, respectively, wherein the first and second remote console protocols are different from each other, convert the received first and second remote console data to first and second converted remote console data, respectively, in a common format in accordance with a common protocol capable of expressing the first and second remote console protocols, transmit the first and second converted remote console data in the common format to a remote management console for display;

receive, at the management appliance, third remote console data in accordance with the serial over local area network text protocol from a third server computer; and convert the third remote console data to third converted remote console data in the common format.

5. The apparatus of claim 4, wherein the first remote console protocol is the remote desktop protocol (RDP).

6. The apparatus of claim 5, wherein the second remote console protocol is the virtual network computing protocol (VNC).

7. The apparatus of claim 4, wherein the remote management console comprises a computer system operative to execute a remote management software application, and wherein the remote management software application is operative to receive the converted remote console data formatted according to the common protocol, to decode the converted remote console data, and to display the remote console data in a single graphical user interface window.

8. The apparatus of claim 7, wherein the program code, when executed by the processor, further causes the apparatus to discover server computers including the first, second, and third server computers and capable of being managed through the apparatus, and to provide information identifying the discovered server computers to the remote management console.

9. The apparatus of claim 8, wherein the third server computer comprises a baseboard management controller operative to format the third remote console data using the serial over local area network text protocol and to transmit the third remote console data to the apparatus.

10. A system for providing a common management console for managing the pre- and post-operating system operation of server computers, the system comprising:

a management appliance comprising a processor, a network port, and a non-volatile memory storing program code, when executed by the processor, causing the appliance to establish network connections to first and second server computers via the network port, receive first and second remote console data from the first and second server computers via the network connections, respectively, wherein the first and second remote console data are formatted according to first and second remote console protocols, respectively, wherein the first and second remote console protocols are different from each other, convert the received first and second remote console data to first and second converted remote console data, respectively, in a common format in accordance with a common protocol capable of expressing the first and second remote console protocols, and transmit the first and second converted remote console data in the common format to one or more remote management consoles for display; and a remote console application configured to receive the first and second converted remote console data from the management appliance, decode the first and second converted remote console data, display the decoded remote console data in a single graphical user interface window;

receive, at the management appliance, third remote console data in accordance with the serial over local area network text protocol from a third server computer; and convert the third remote console data to third converted remote console data in the common format.

* * * * *